United States Patent Office 3,491,620
Patented Jan. 27, 1970

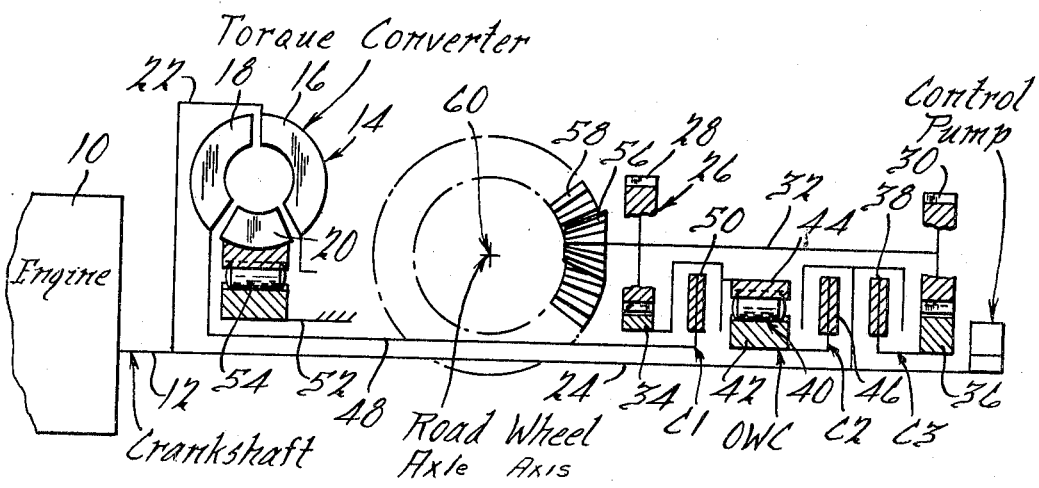

3,491,620
NONSYNCHRONOUS POWER TRANSMISSION MECHANISM HAVING BOTH MECHANICAL AND HYDROKINETIC TORQUE DELIVERY PATHS IN THE LOWEST SPEED RATIO DRIVE CONDITION
Andrew Paredes, Wayne, Mich., assignor to Ford Motor Company, Dearborn, Mich., a corporation of Delaware
Filed Mar. 14, 1968, Ser. No. 713,128
Int. Cl. F16h 47/00
U.S. Cl. 74—732    4 Claims

ABSTRACT OF THE DISCLOSURE

A racing car transmission having two forward driving ratios, the ratios being selected by tandem clutches which may be applied and released under torque.

General description of the invention

The invention includes a countershaft gearing arrangement capable of providing two forward-driving gear ratios as engine torque is delivered from an engine crankshaft to a transversely situated axle shaft. The axle shaft is located between a hydrokinetic torque converter and the countershaft gearing. Ratio changes between the high gear ratio and the low gear ratio are accomplished by selectively engageable clutches. The clutches are engaged and disengaged to accomplish ratio shifts without the necessity for establishing synchronism between the torque delivery elements of the driveline prior to the shift, and without the necessity for timing the application and release of the clutches.

The hydrokinetic torque converter is adapted to drive the torque input element of the gearing during acceleration from a standing start. The converter is bypassed while the gearing is maintained in the low gear ratio condition by disengaging the turbine of the converter and applying instead a low-gear ratio clutch which connects directly the engine to the same power input element of the gearing. Thus two low gear, torque-delivery paths are achieved, one being fully mechanical and the other being hydrokinetic.

An upshift from the low gear ratio to the high gear ratio is achieved by engaging the high speed ratio clutch as the torque is delivered to a second power input element of the gearing. The first power input element freewheels during high gear ratio operation.

In a racing car having my improved driveline, maximum accelerating torque is available to accelerate onto the trackway from a pit stop. The low ratio, torque-delivery path includes at that time the hydrokinetic unit, which multiplies engine torque delivered to the power input element of the gearing. While the gearing is still conditioned for low ratio operation, the hydrokinetic unit may be disengaged and a direct mechanical connection can be established between the engine and the same power input element of the gearing as acceleration continues.

After the vehicle has reached a cruising condition, the gearing can be conditioned by appropriate selection of torque delivery clutches for high ratio operation. A second power input element for the gearing is substituted for the first power input element.

The gearing includes a pair of torque delivery paths situated in parallel disposition. The output gear elements are connected drivably to one of the parallel shafts and the power input gear elements are adapted to be clutched selectively to the other torque delivery shaft. The strategic disposition of overruning coupling connections between the engine crankshaft and the first power input element of the gearing makes it unnecessary to time the engagement and release of the clutches. All ratio changes during the acceleration period are nonsynchronous.

Brief description of the figures of the drawing

FIGURE 1 shows in schematic form a longitudinal cross-sectional assembly view of the torque delivery elements formed by my improved driveline; and
FIGURE 2 is a chart showing the clutch engagement and release pattern for the driveline of FIGURE 1.

Particular description of the invention

In FIGURE 1 numeral 10 designates the position of the vehicle engine, which may be an internal combustion engine having a crankshaft 12. A hydrokinetic torque converter 14 is situated directly adjacent the engine 10. It includes a bladed impeller 16, a bladed turbine 18 and a bladed stator 20. Impeller 16 includes an impeller shell 22 which is connected directly to the crankshaft 12 through a suitable drive plate assembly.

Crankshaft 12 is connected also to torque delivery shaft 24, which extends concentrically through the torque converter 14 and through the gearing assembly 26. Gearing assembly 26 includes a pair of output gears 28 and 30, which are connected drivably to countershaft 32. Gear 28 meshes with driving gear 34 and gear 30 meshes with driving gear 36. Shaft 24 extends concentrically through gears 34 and 36. Clutch 38, which may be a servo-operated friction clutch, is adapted to selectively connect shaft 24 to the gear 36.

An overrunning coupling 40 is situated between the gear units 28 and 30. It includes an inner race 42 and an outer race 44. A selectively-engageable, servo-operated friction clutch is adapted to connect selectively the race 42 with the shaft 24. The outer race 44 is connected to the gear 34. The outer race 44 can be connected also to turbine sleeve shaft 48 through a selectively-engageable, servo-operated clutch 50. Overrunning clutch elements, such as rollers, are situated between the races 42 and 44. Race 44 is cammed to permit one-way locking action with the roller elements and to permit freewheeling motion of one race with respect to the other in one direction.

Sleeve shaft 48 surrounds torque delivery shaft 24. It is connected directly to the turbine 18.

Stator 20 of the torque converter 14 includes a hub that is mounted on a stationary stator sleeve shaft 52. An overrunning brake 54 establishes a one-way braking action for the stator 20 for inhibiting rotation in a direction opposite to the direction of rotation of the turbine 18.

Countershaft 32 is connected drivably to bevel drive pinion 56, which meshes with differential ring gear 58. This gear forms a part of a differential gear assembly which distributes torque from the driveshaft 32 to each of two axle shafts situated for rotation about a common axis 60. One traction wheel is connected to each axle shaft. The axis 60 is transversely situated with respect to the axis of the converter 14 and the gearing assembly 26, and is positioned between the converter 14 and the gear unit 28.

FIGURE 2 shows a clutch engagement and release pattern for establishing each of two low speed driving ratios and a high speed ratio. To establish low speed ratio with the hydrokinetic unit in the torque delivery path, the clutch C1 shown in part at 50 is applied. The other selectively engageable clutches show in part at 46 and 38, which are identified by the symbols C2 and C3 respectively, are released. The overrunning clutch 40 has been and OWC to the driving gear 34.

When clutch C1 is applied, turbine torque developed by the torque converter 14 is distributed through the sleeve shaft 48 and through the applied clutch C1 to the driving gear 34. This torque is multiplied by the gears 34 and 28, and the resulting output torque is distributed to the differential drive pinion 58. This driving condition is used during acceleration from a standing start. When the vehicle is in motion, the converter is bypassed by engaging the clutch C2. Engine torque now is distributed from the shaft 24 and through the clutches C2 and OWC to the driving gear 34.

The turbine 18 and the impeller 16 now rotate in unison. Therefore, no turbine torque is developed. If coast braking takes place during operation in the low speed ratio, the braking torque is distributed from the gear 28 and the gear 34 through the clutch C1. This underdrives the turbine 18 so that braking torque is distributed hydrokinetically back to the engine.

To produce an upshift to the high speed ratio, clutch C1 is released and clutch C3 is applied. Clutch C2 remains applied. Clutch C1 should be released before the 2:3 upshift is initiated.

During operation in the high speed ratio, the driveline is fully mechanical since the torque converter 14 again is bypassed. Engine torque is distributed at this time from the shaft 24, through the clutch C3 directly to the gear 36. This gear drives the output gear 30 and the differential bevel pinion 56. The overrunning clutch OWC freewheels at that time. All of the ratio shifts during the acceleration period are nonsynchronous and nontimed. Each upshift is achieved by engaging a single friction clutch.

The hydrokinetic torque multiplier in the low speed operating range is of advantage when the vehicle is accelerated from a standing start as the vehicle returns to the high-speed trackway.

During cruising operation in either the high speed ratio or the low speed ratio, the driveline is fully mechanical or solid. The converter, therefore, can be designed for optimum performance during the initial phase of the low speed operating condition. This low speed range performance need not be compromised to satisfy the cruising requirements since the converter itself is ineffective during operation in the cruising ratios.

Having thus described a preferred form of my invention, what I claim and desire to secure by U.S. Letters Patent is:

1. In a driveline for a wheeled vehicle having an engine and torque output shafts situated on an axis that is transverse with respect to the direction of the axis of the engine, a gear unit comprising a pair of output gears connected drivably to a countershaft, a pair of input gears, one input gear meshing with each output gear, a torque delivery shaft having an axis coinciding with the axis of said input gears, first, second and third friction clutches each having driving and driven portions, a hydrokinetic torque converter having a bladed impeller, a bladed turbine and a bladed stator situated in toroidal fluid flow relationship, a sleeve shaft connected to said turbine and surrounding said torque delivery shaft, said first clutch connecting drivably said sleeve shaft and one of said input gears, an overrunning clutch having inner and outer races and clutch elements connecting said races during torque delivery therethrough in one direction and accommodating free-wheeling motion therebetween during torque delivery in the opposite direction, a driven portion of said first clutch being connected to one race, the driven portion of said second clutch being connected to the other race, said third clutch establishing selectively a driving connection between said torque delivery shaft and the other input gear.

2. The combination as set forth in claim 1 wherein said torque output shaft axis is situated between one output gear and the impeller of said torque converter, said engine being connected directly to said impeller and also to the torque delivery shaft.

3. The combination as set forth in claim 2 wherein the driving portion of said first clutch is a clutch disc connected to said sleeve shaft, a driving portion of said second clutch being a clutch disc connected to said other overrunning clutch race, and the driving portion of said third clutch being a clutch disc connected to said second input gear.

4. The combination as set forth in claim 1 wherein the driving portion of said first clutch is a clutch disc connected to said sleeve shaft, a driving portion of said second clutch being a clutch disc connected to said other overrunning clutch race, and the driving portion of said third clutch being a clutch disc connected to said second input gear.

References Cited

UNITED STATES PATENTS

| 2,772,581 | 12/1956 | Maier et al. | 74—732 |
| 2,949,047 | 8/1960 | Burckhardt | 74—732 |
| 3,003,367 | 10/1961 | Winchell | 74—732 XR |
| 3,035,455 | 5/1962 | Peras | 74—732 XR |

LEONARD H. GERIN, Primary Examiner